United States Patent
Philip

(10) Patent No.: US 12,548,318 B2
(45) Date of Patent: Feb. 10, 2026

(54) SYSTEM AND METHOD FOR DETECTING AND TRACKING OBJECTS USING A COMPUTER VISION MODEL

(71) Applicant: ASSERT SECURE TECH PVT. LIMITED, Mumbai (IN)

(72) Inventor: Job Varughese Philip, Mumbai (IN)

(73) Assignee: ASSERT SECURE TECH PVT. LIMITED, Mumbai (IN)

( * ) Notice: Subject to any disclaimer, the term of this patent is extended or adjusted under 35 U.S.C. 154(b) by 0 days.

(21) Appl. No.: 19/043,194

(22) Filed: Jan. 31, 2025

(65) Prior Publication Data
US 2025/0252729 A1 Aug. 7, 2025

(30) Foreign Application Priority Data
Feb. 1, 2024 (IN) .............................. 202421006709

(51) Int. Cl.
*G06V 10/94* (2022.01)
*G06T 7/20* (2017.01)
*G06V 10/25* (2022.01)
*G06V 20/52* (2022.01)
*G06V 20/58* (2022.01)

(52) U.S. Cl.
CPC .............. *G06V 10/945* (2022.01); *G06T 7/20* (2013.01); *G06V 10/25* (2022.01); *G06V 20/52* (2022.01); *G06V 20/58* (2022.01); *G06T 2200/24* (2013.01); *G06T 2207/10016* (2013.01); *G06T 2207/20104* (2013.01); *G06T 2207/30232* (2013.01)

(58) Field of Classification Search
CPC .................. G06T 7/20; G06T 2200/24; G06T 2207/10016; G06T 2207/20104; G06T 2207/30232; G06V 10/25; G06V 10/945; G06V 20/52; G06V 20/58
See application file for complete search history.

(56) References Cited

U.S. PATENT DOCUMENTS

| | | | |
|---|---|---|---|
| 11,961,319 B2* | 4/2024 | Mullins | G06V 20/53 |
| 2010/0118147 A1* | 5/2010 | Dorneich | H04N 21/4331 348/143 |
| 2013/0208124 A1* | 8/2013 | Boghossian | H04N 7/181 382/103 |
| 2014/0050455 A1* | 2/2014 | Ni | H04N 7/181 386/E5.028 |
| 2016/0019935 A1* | 1/2016 | Adam | H04N 7/181 386/223 |

(Continued)

*Primary Examiner* — Katrina R Fujita

(57) ABSTRACT

Embodiments herein provide a method for detecting and tracking objects using a Computer Vision (CV) model. The method includes (i) receiving media content from a user device, (ii) rendering the media content into one or more frames with pre-defined dimensions, (iii) enabling a user to select one or more mouse points on at least one of the one or more frames to define a Region of Interest (ROI) and line crossings along with directions, (iv) converting the one or more mouse points into coordinates, (v) identifying coordinate details of the region of interest and the line crossings along with the directions, and (vi) tracking each object in the region of interest and the line crossings along with the directions based on the coordinate details and by assigning identification numbers to each object in the at least one of the one or more frames.

20 Claims, 15 Drawing Sheets

(56) References Cited

U.S. PATENT DOCUMENTS

| | | | | |
|---|---|---|---|---|
| 2018/0157915 A1* | 6/2018 | Sherry | .................... | H04N 21/84 |
| 2018/0359449 A1* | 12/2018 | Matsumoto | ...... | G08B 13/19686 |
| 2019/0139229 A1* | 5/2019 | Ohira | ........................ | G06T 7/11 |
| 2019/0318177 A1* | 10/2019 | Steinberg | .............. | G01S 17/931 |
| 2020/0364999 A1* | 11/2020 | Mullins | ............ | G08B 13/19645 |
| 2021/0279470 A1* | 9/2021 | Zadeh | .................... | G06F 11/327 |
| 2021/0325861 A1* | 10/2021 | Hou | ........................ | G06N 20/00 |
| 2021/0392611 A1* | 12/2021 | Murdock | .............. | H04W 4/021 |
| 2022/0005332 A1* | 1/2022 | Metzler | ............ | G08B 13/19682 |
| 2022/0374635 A1* | 11/2022 | Xiong | ............. | G08B 13/19608 |
| 2023/0105423 A1* | 4/2023 | Deshmukh | ............. | G06V 10/25 |
| | | | | 348/154 |
| 2023/0368536 A1* | 11/2023 | Xiong | .................... | H04N 17/002 |
| 2025/0095371 A1* | 3/2025 | Thayer | .................... | G06V 10/40 |

* cited by examiner

SYSTEM AND METHOD FOR DETECTING AND TRACKING OBJECTS USING A COMPUTER VISION MODEL

BACKGROUND

Technical Field

Embodiments herein generally relate to computer vision model, more particularly, to a system and method for detecting and tracking objects using a Computer Vision (CV) model.

Description of the Related Art

The progress in the field of Artificial Intelligence (AI) has forever helped mankind, new horizons are being discovered to make its usage much easier and more effective. One such horizon is industry needs like retail, warehouses, etc. The difficulty faced by the AI in industry needs is most of the data are videos and the deployment have to face a lot of constraints. Also, there are minute chances of non-technical personnel understanding and visualizing computer vision models and putting them to use. Hence there is a need for a new tool to address these issues.

Many conventional systems exist with no-code and low-code platforms. The conventional systems are pertinent to developing machine learning and computer vision systems without needing to write code. The conventional systems also provide a variety of capabilities such as data ingestion, labeling and annotation, model building/training, application authoring via visual drag-and-drop interfaces, object detection, video processing, and model deployment. The conventional systems provide generalized no-code environments for machine learning model development and computer vision application creation. However, most of the conventional systems are inclined towards object and anomaly detection functionality in video streams using techniques like pixel analysis and frame differencing.

However, the conventional systems may require a deep understanding of coding and complex algorithms, posing a significant barrier for non-technical users. Some existing solutions also lack tailored features for specific industries, leading to less optimized performance for particular use cases.

Existing conventional systems may primarily focus on image-based processing, potentially limiting their capabilities in scenarios that require video-based analysis. The existing conventional systems lack user-friendly interfaces or intuitive ways for users to interact with and modify the model's behavior. The existing conventional systems provide real-time visualizations that result in delayed feedback, hindering the user's ability to make quick adjustments.

Also, the existing conventional systems rely on monolithic architectures, making them less modular, flexible, and harder to maintain or scale. The existing conventional systems lack innovative user confirmation mechanisms, leading to potential challenges in user engagement and understanding.

Therefore, there is a need for advancements in addressing the limitations of traditional platforms and developing an interface which is user-friendly and can be adapted to industrial needs.

SUMMARY

In view of the foregoing, an embodiment herein provides a method for detecting and tracking one or more objects using a Computer Vision (CV) model. The method includes receiving media content from a user device. The media content includes video of pre-defined areas of an entity. The method includes rendering the media content into one or more frames with pre-defined dimensions displayed on a display screen associated with the user device. The method includes enabling a user to select one or more mouse points on at least one of the one or more frames to define a Region of Interest (ROI) and line crossings along with directions in the at least one of the one or more frames using a mouse associated with the user device. The method includes converting the one or more mouse points into coordinates using width and height of the at least one of the one or more frames and relative position of the one or more mouse points to the at least one of the one or more frames using the CV model. The method includes identifying coordinate details of the region of interest and the line crossings along with the directions by determining a hierarchy of a stack of coordinates corresponding to the mouse points events by tracking events of the one or more mouse points on the at least one of the one or more frames using the CV model. The method includes tracking each object in the region of interest and the line crossings along with the directions based on the coordinate details and by assigning identification numbers to each object in the at least one of the one or more frames using the CV model.

In some embodiments, the method includes defining (i) the ROI by selecting at least three mouse points in the at least one of the one or more frames and (ii) the line crossings by selecting two mouse points in the at least one of the one or more frames by the user.

In some embodiments, the method includes pre-processing the at least one of the one or more frames from the media content using at least one of pre-processing techniques.

In some embodiments, at least one pre-defined area for the entity is selected by (i) enabling the user to select the entity from one or more entities using the user device, and (ii) enabling the user to select the at least one pre-defined area from one or more pre-defined areas that is generated based on the entity.

In some embodiments, the media content of the pre-defined areas of the entity are captured using an image capturing device.

In some embodiments, the method includes determining a database for each object by storing the identification number of each object in the at least one of the one or more frames using the CV model. The database of each object is analysed at end of the at least one of the one or more frames.

In some embodiments, the method includes generating analytics of the media content by overlaying the media content on a dashboard associated with the user device using the CV model.

In one aspect, a system is provided for detecting and tracking one or more objects using a Computer Vision (CV) model. The system includes a server. The server includes a memory and a processor. The memory includes set of instructions and the processor executes the set of instructions. The processor is configured to receive media content from a user device. The media content includes video of a pre-defined area of an entity. The processor is configured to render the media content into one or more frames with pre-defined dimensions displayed on a display screen associated with the user device. The processor is configured to enable a user to select one or more mouse points on at least one of the one or more frames to define a Region of Interest (ROI) and line crossings along with directions in the at least one of the one or more frames, using a mouse associated with the user device. The processor is configured to convert the one or more mouse points into coordinates using width and height of the at least one of the one or more frames and relative position of the one or more mouse points to the at least one of the one or more frames using the CV model. The processor is configured to identify coordinate details of the region of interest and the line crossings along with the directions by determining a hierarchy of a stack of coordinates corresponding to the mouse points events by tracking events of the one or more mouse points on the at least one of the one or more frames using the CV model. The processor is configured to track each object in the region of interest and the line crossings along with the directions based on the coordinate details and by assigning identification numbers to each object in the at least one of the one or more frames using the CV model.

In some embodiments, the processor is configured to define (i) the ROI by selecting at least three mouse points in the at least one of the one or more frames and (ii) the line crossings by selecting two mouse points in the at least one of the one or more frames by the user.

In some embodiments, the processor is configured to pre-process the at least one of the one or more frames from the media content using at least one of pre-processing techniques.

In some embodiments, at least one pre-defined area for the entity is selected by (i) enabling the user to select the entity from a plurality of entities (306A-N) using the user device, and (ii) enabling the user to select the at least one pre-defined area from a plurality of pre-defined areas that is generated based on the entity using the user device.

In some embodiments, the media content of the pre-defined areas of the entity are captured using an image capturing device.

In some embodiments, the processor is configured to determine a database for each object by storing the identification number of each object in the at least one of the one or more frames using the CV model, wherein the database of each object is analyzed at end of the at least one of the one or more frames.

In some embodiments, the processor is configured to generate analytics of the media content by overlaying the media content on a dashboard associated with the user device using the CV model.

In another aspect, there is provided one or more non-transitory computer-readable storage mediums storing one or more sequences of instructions, which when executed by one or more processors, cause a method for detecting and tracking a plurality of objects using a Computer Vision (CV) model. The method includes rendering the media content into one or more frames with pre-defined dimensions displayed on a display screen associated with the user device. The method includes enabling a user to select one or more mouse points on at least one of the one or more frames to define a Region of Interest (ROI) and line crossings along with directions in the at least one of the one or more frames using a mouse associated with the user device. The method includes converting the one or more mouse points into coordinates using width and height of the at least one of the one or more frames and relative position of the one or more mouse points to the at least one of the one or more frames using the CV model. The method includes identifying coordinate details of the region of interest and the line crossings along with the directions by determining a hierarchy of a stack of coordinates corresponding to the mouse points events by tracking events of the one or more mouse points on the at least one of the one or more frames using the CV model. The method includes tracking each object in the region of interest and the line crossings along with the directions based on the coordinate details and by assigning identification numbers to each object in the at least one of the one or more frames using the CV model.

The system allows users to seamlessly run/configure computer vision models without the need for programming expertise. This simplifies the entire process from model deployment to execution. The system specifically executes a computer vision model on videos. This system expands the application of AI models beyond static images, catering to the dynamic nature of video data. Users can effortlessly define their rules, regions of interest, and use cases without delving into code. The user interface on the user device enables users to specify parameters through simple clicks and mouse drags, fostering a no-code environment for customization. The system not only runs/configures AI models but also provides a visual representation of their outputs. Users can easily comprehend and analyze the results, facilitating a deeper understanding of the model's performance without delving into complex coding or technical details. The system offers flexibility in handling video input sources. Users can seamlessly run computer vision models on default videos, upload their videos, or provide camera details. This adaptability ensures users can leverage the best computer vision models effortlessly, all within a no-code framework. Users have the power to customize their AI applications intuitively.

By utilizing mouse clicks and drags, the users can effortlessly define regions of interest, rules, and other parameters, empowering them to tailor AI models to their specific requirements. The system 100 not only runs/configures AI models but also provides a visual representation of their outputs. Users can easily comprehend and analyze the results facilitating a deeper understanding of the model's performance without delving into complex coding or technical details. Users can run the most effective AI models by either utilizing default models integrated into the system or uploading their own models. This flexibility ensures that users can choose the best-suited models for their specific applications, contributing to enhanced performance and accuracy.

By eliminating the need for coding, the system 100 empowers a broader audience, including those without technical backgrounds. This democratization of AI usage ensures that individuals from various domains can harness the potential of computer vision without programming complexities. The system 100 seamlessly integrates user-defined inputs into the AI model pipeline. This ensures a smooth flow of information, allowing users to dictate the rules, regions of interest, and other parameters that influence the model's behavior, all within an intuitive no-code framework. Through a user-friendly interface, the system 100 offers visualization tools that enhance user understanding. Users can interact with the results, gaining insights and making informed decisions without grappling with the intricacies of coding.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
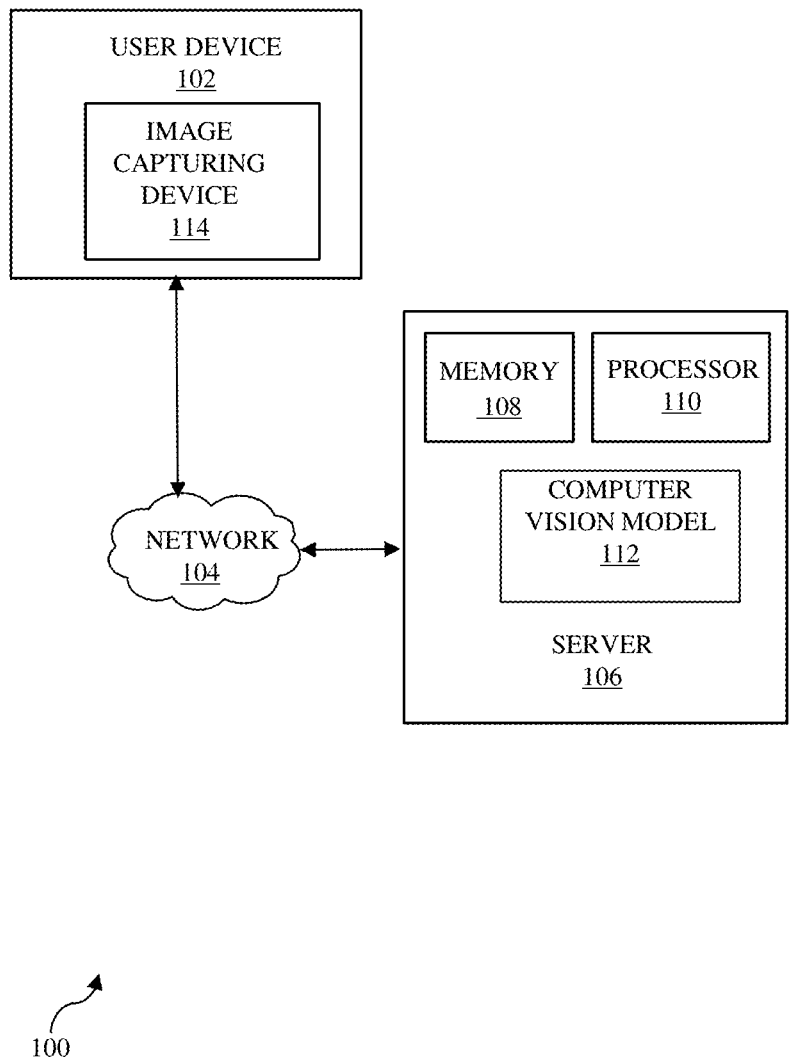
FIG. 1 illustrates a block diagram of a system to detect and track objects using a Computer Vision (CV) model according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for detecting and tracking objects using Computer Vision model. Referring now to the drawings, and more particularly, FIG. 1 through FIG. 7, where similar reference characters denote corresponding features consistently throughout the figures, preferred embodiments are shown.

FIG. 1 illustrates a block diagram of a system 100 to detect and track objects using a Computer Vision (CV) model (112) according to some embodiments herein. The system 100 includes a network 104, a server 106, and a user device 102 that includes an image capturing device 114. The media content captured using the image capturing device 114 and shared to the server 106 over the network 104. The media content may be a video, one or more images, or live streams from Real-Time Streaming Protocol (RTSP) cameras.

The user device 102 may be a handheld device, a mobile phone, a kindle, a Personal Digital Assistant (PDA), a tablet, a laptop, a desktop computer, a wearable device, an electronic notebook, a smartphone, a stationary device, a partially-stationary device or a non-traditional user device like IoT nodes. The image-capturing device 114 may be a camera. In some embodiments, the network 104 is a wired network or a wireless network. In some embodiments, the network 104 is a combination of a wired and wireless network. In some embodiments, the network 104 is Internet. The server 106 includes a memory 108 that stores a database, a processor 110 that executes a set of instructions, and the Computer Vision (CV) model 112 that is implemented on the server 106. The database may store one or more sequences of instructions. The server 106 is configured to receive the media content from the user device 102 through the network 104.

Figure 3A:
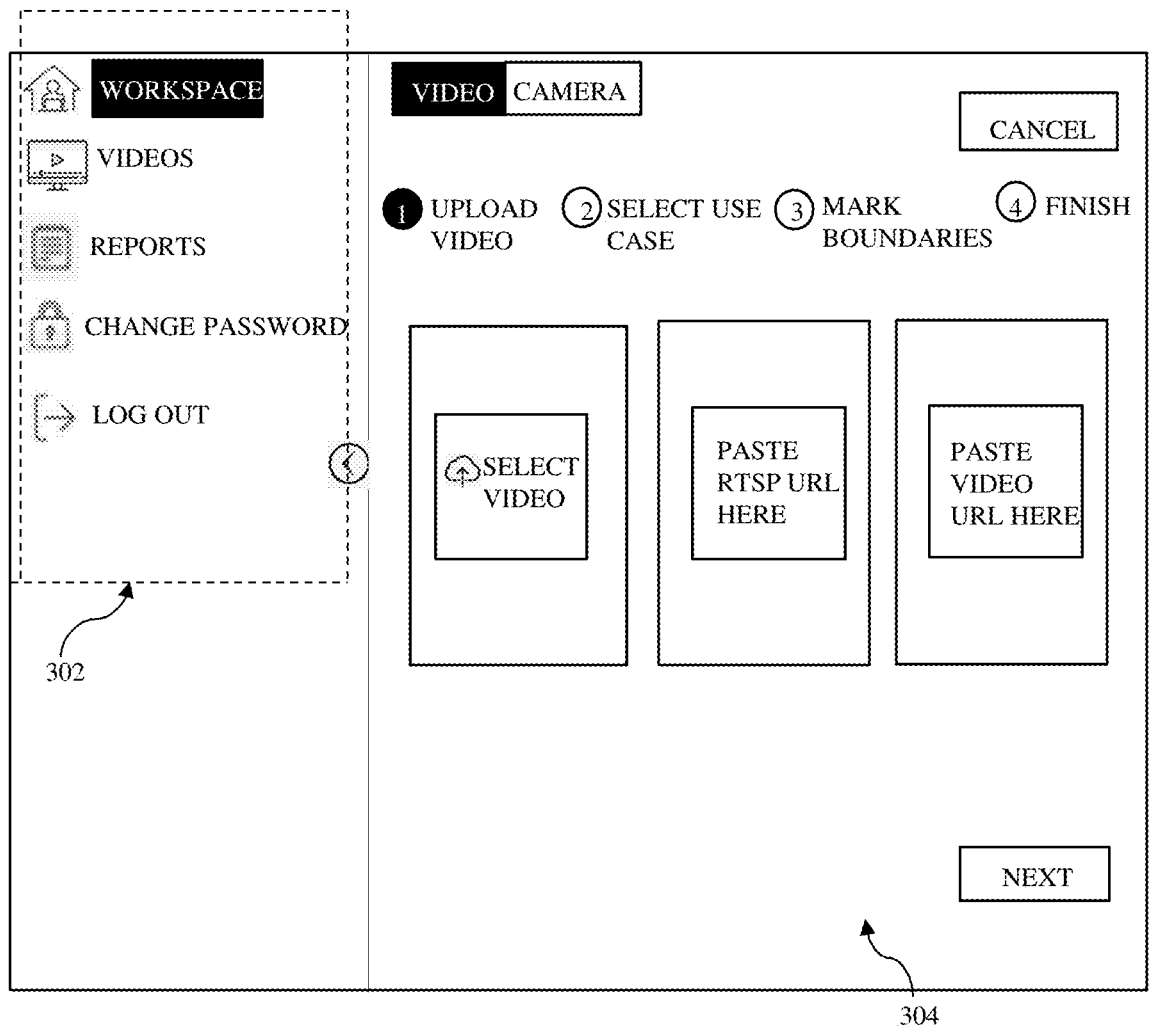
FIG. 3A illustrates an exemplary view of a graphical user interface (GUI) displaying a workspace section in a task pane according to some embodiments herein.
Figure 3B:
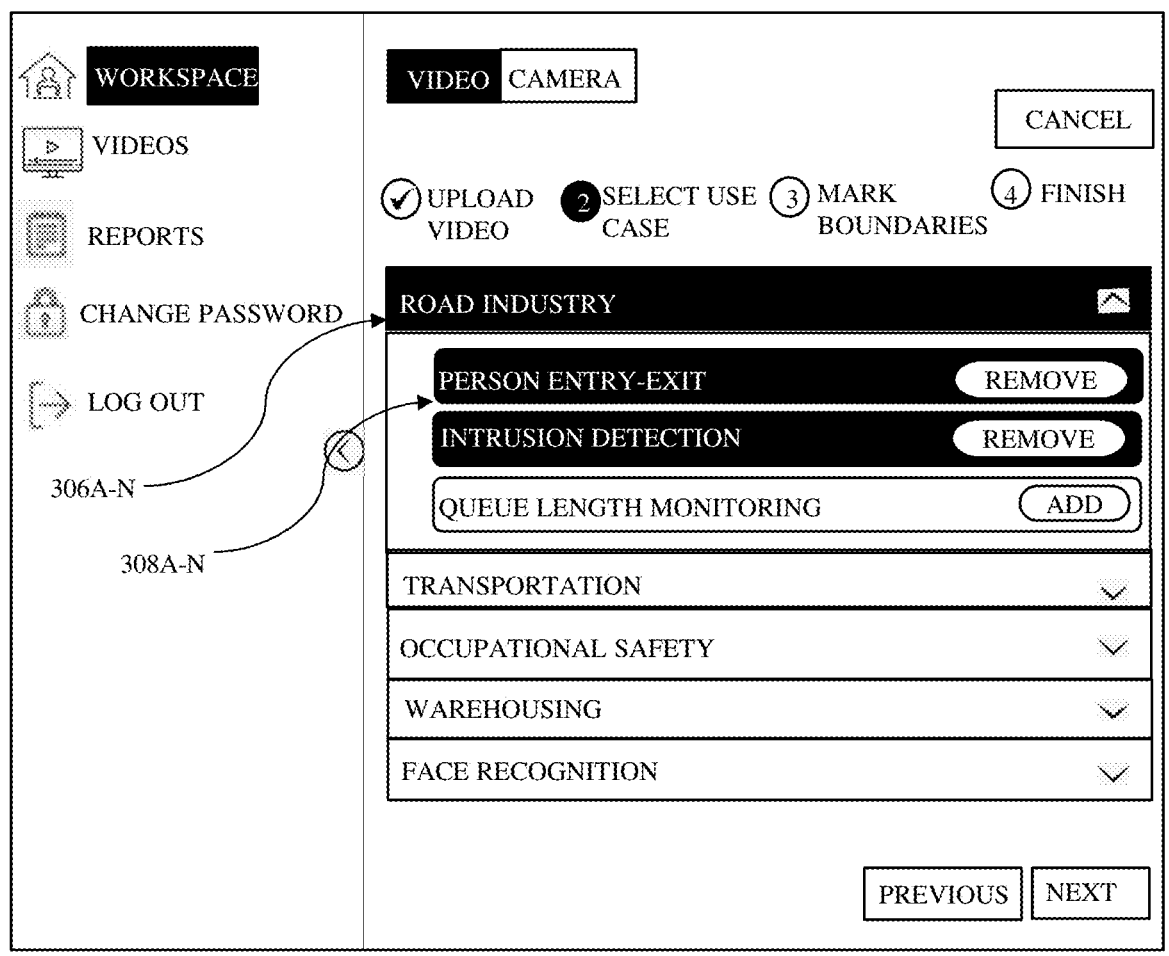
FIG. 3B illustrates an exemplary view of a graphical user interface (GUI), which presents the process of selecting a use case according to some embodiments herein.

In some embodiments, the server 106 is configured to provide one or more segments of choices on a user device 102 associated with a user to enable the user to select a segment of choice or entity (e.g. a retail or a toll road or an industrial setup, as shown in FIG. 3B). In some embodiments, the server 106 provides one or more applications within the selected segment of choice on the user device 102 to enable the user to select an application/use case (e.g. as shown in FIG. 3B). In some embodiments, the server 106 automatically configures the computer vision (CV) model 112 that is specific for the selected application of the selected segment of choice.

(i.e.,) the server 106 enables the user to select the entity from one or more entities on a user device 102 associated with the user. The server 106 further enables the user to select at least one pre-defined area by providing one or more pre-defined areas within the selected entity on the user device 102. The entities may include, but are not limited to, retail, transportation, occupational safety, facial recognition, and warehousing. The pre-defined areas within the entities may include, but are not limited to, person entry-exit, intrusion detection, queue length monitoring, overcrowding detection, footfall monitoring, vehicle classification, vehicle counting, Personal Protective Equipment (PPE): helmet and vest detection, early fire and smoke detection, Material Handling Equipment (MHE) or forklift safety incidents, Automatic Number Plate Recognition (ANPR), and speed detection and analysis. The server 106 automatically configures the CV model 112 which is specific for the selected pre-defined areas of the selected entity. The server 106 renders the media content into one or more frames with pre-defined dimensions displayed on a display screen of the user device 102.

The server 106 visualizes the one or more frames of the media content using the user device 102 by extracting at least one of the one or more frames from the media content. The server 106 enables the user to interact with the at least one of the one or more frames of the media content provided on the user device 102 using a mouse. The server 106 enables the user to select mouse points on the at least one or more frames to define a Region of Interest (ROI) and line crossings along with directions in the at least one or more frames. The mouse points are the positions clicked by the user on the at least one or more frames using a mouse.

In some embodiments, the server 106 displays the CV model 112 in a display of the user device 102 to enable the user to interact with the CV model 112. For example, the CV model 112 is displayed on the user's devices on its display, dashboard, browser, or application. In some embodiments, the server 106 enables the user to access the CV model 112 through the user device 102 populated with a video.

In some embodiments, the at least one of the one or more frames from the media content are extracted using the Fast Forward Moving Picture Experts Group (ffmpeg) multimedia framework to register mouse points for defining the ROIs and Line Crossings along with directions. The server 106 enables the user to select the mouse points on the at least one of the one or more frames by following the set of instructions that are provided for the selected pre-defined areas. The set of instructions may vary for each pre-defined area within the entities. The server 106 enables the user to select at least three mouse points on the first frame to define the ROI. The server 106 enables the user to select two mouse points on the first frame to define the line crossings. The ROI is a specific area on the at least one or more frames. The line crossing is a line that indicates direction and crossings.

The server 106 converts the mouse points that is selected by the user on the first frame into coordinates by keeping width and height of the at least one or more frames as reference and relative position of the mouse points to the at least one or more frames using the CV model 112. The server 106 enables to user to review the markings on the at least one of the one or more frames by displaying a review screen on the user device 102. The review screen presents the selected entity, selected pre-defined areas, and the media content along with their corresponding markings. The markings are made by connecting the mouse points. The coordinate details of the ROI and the line crossings along with directions is identified by determining the hierarchy of the stack of coordinates. The hierarchy of the stack of coordinates is determined by tracking the events of the mouse points on the at least one or more frames using the CV model 112. The at least one of the one or more frames are pre-processed to standardize its shape and size, aligning with a pre-determined format for tracking the events of the mouse points. In some embodiments, the user is prompted to select mouse points between 4-6 times per step, aligning with the requirements of the CV model 112.

When the user interacts with the at least one of the one or more frames of the media content provided on the user device 102, the user is enabled to select/provide an input to accept or discard a change in the at least one of the one or more frames of the media content appearing in the user device 102. For example, the input includes 'y' for accepting a change and 'q' for discarding and restarting a change using a keyboard of the user. The input of the user is processed with every click of 'y' or 'q' by the user on the keyboard, or discarding the input. Upon receiving a confirmation from the user, the CV model 112 is configured by crystalizing the input of the CV model 112 and defining the CV model 112 based on the crystalized input to enable the CV model 112 to perform inference/prediction.

In some embodiments, when the user presses "y", the coordinates are initially stored in a temporary cache, ensuring no hard save occurs without user confirmation. When "y" is pressed by the user, the server 106 implements a concise function that recognizes user satisfaction with the mouse points, and then the coordinates are saved. When the user presses "q" the cache is cleared. The coordinates are saved only when the user presses the "y".

The server 106 tracks each object in the ROI and the line crossings along with directions based on the coordinate details by assigning identification numbers to each object in the media content using the CV model 112. The server 106 detects and tracks the objects in the media content by determining events of each object in each frame. The events of each object in each frame are determined by storing the identification number of each object in a database. The identification number of each object identified in each frame is saved in a separate database for analysis. The server 106 analyses the database of each object at the end of each frame. In some embodiments, the objects are items of interest detected within a video or image, such as people, vehicles, or other identifiable items, depending on the selected pre-defined areas.

The server 106 organizes metadata associated with each frame in the memory 108 and populates on a user interface on the user device 102. The metadata may include detection class, detection object identification, detection confidence, detection coordinates, image of the detected object, frame number when detected, time of the detection, where was the object first detected, and how the placement of the object has changed over time in coordinates and movement. In some embodiments, the server 106 enables the user to access the user interface/dashboard of the user device 102.

The server 106 generates analytics by overlaying the media content on a dashboard associated with the user device 102 using the computer vision model 112. The analytics may be a number of objects in the region of interest, a number of people entered, a number of people exited, etc.

Figure 2:
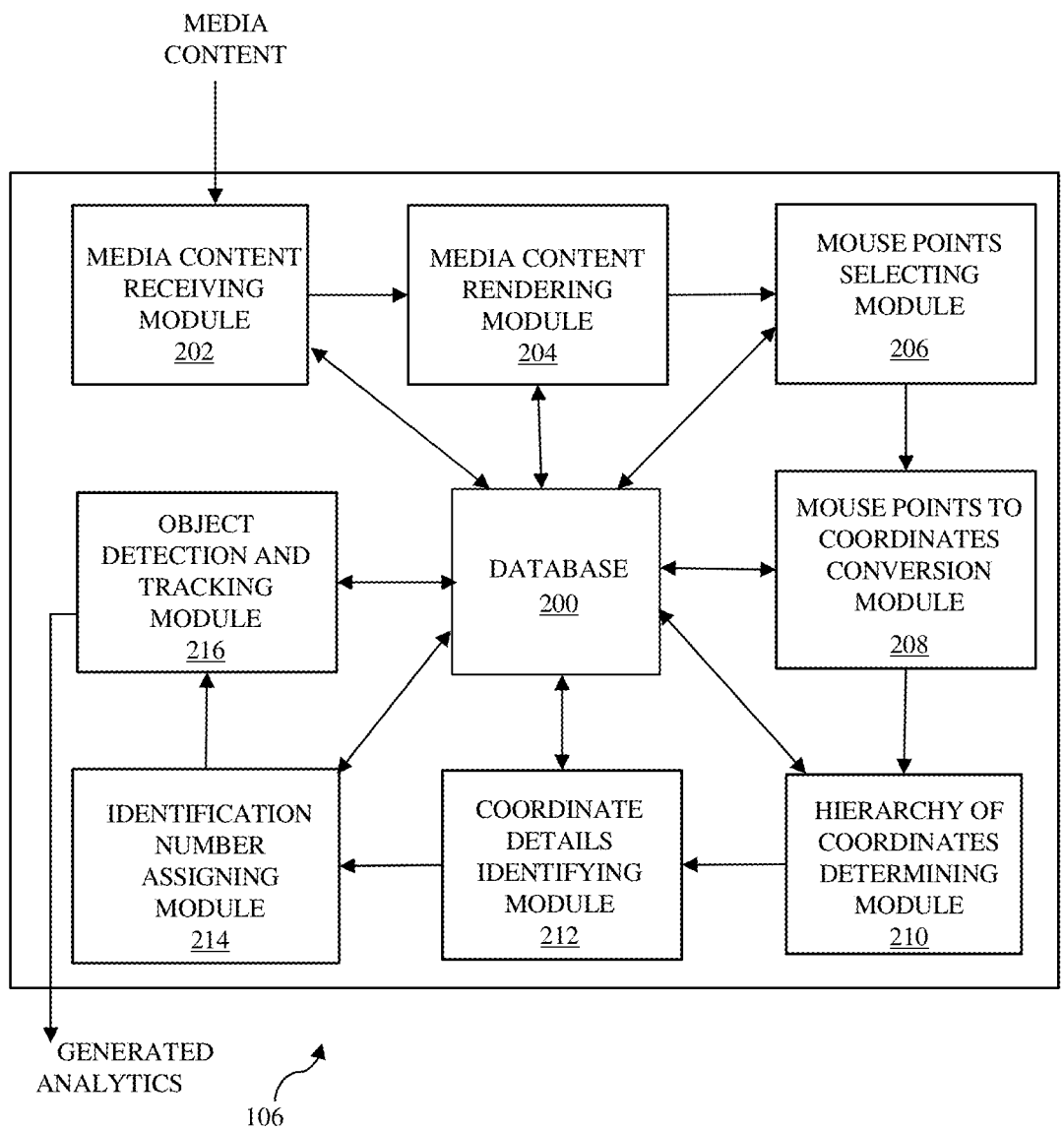
FIG. 2 illustrates an exploded view of a server of FIG. 1 according to some embodiments herein.

FIG. 2 illustrates an exploded view of a server 106 of FIG. 1 according to some embodiments herein. The server 106 includes a database 200, a media content receiving module 202, a media content rendering module 204, a mouse points selecting module 206, a mouse points to coordinates conversion module 208, a hierarchy of coordinates determining module 210, coordinate details identifying module 212, an identification number assigning module 214 and an object detection and tracking module 216. The database 200 stores a set of modules of the server 106 that are executed by a processor 110.

The media content receiving module 202 receives the media content from the user device 102 or in real-time from the image capturing device 114. The media content may be a video, or one or more images, or both.

The media content rendering module 204 renders the media content into one or more frames with pre-defined dimensions displayed on a display screen. The media content rendering module 206 visualizes at least one of the one or more frames of the media content using the user device 102 by extracting the one or more frames from the media content.

The mouse points selecting module 206 enables the user to select mouse points on the at least one of the one or more frames to define a Region of Interest (ROI) and line crossings along with directions in the at least one of the one or more frames. The mouse points selecting module 206 tracks events of the user's mouse clicks on the displayed media contents.

The mouse points to coordinates conversion module 208 converts the mouse points that is selected by the user on the at least one of the one or more frames into coordinates by keeping width and height of the first frame as reference and relative position of the mouse points to the at least one of the one or more frames. When the user interacts with the first frame of the media contents provided on the user device 102, the user is enabled to select/provide an input to accept or discard a change in the at least one of the one or more frames of the media content appearing in the user device 102. For example, the input includes 'y' for accepting a change and 'q' for discarding and restarting a change using a keyboard of the user. The input of the user is processed with every click of 'y' or 'q' by the user on the keyboard, or discarding the input. The input is converted in a format that the computer vision model 112 requires. Upon receiving a confirmation from the user, the CV model 112 is configured by crystalizing the input of the CV model 112 and defining the CV model 112 based on the crystalized input to enable the CV model 112 to perform inference/prediction.

The hierarchy of coordinates determining module 210 determines the hierarchy of the stack of coordinates by tracking the events of the mouse points on the at least one or more frames using the CV model 112. The at least one of the one or more frames are pre-processed to standardize its shape and size, aligning with a pre-determined format for tracking the events of the mouse points. In some embodiments, when the user presses 'y,' the coordinates are initially stored in a temporary cache, ensuring no hard save occurs without user confirmation. When 'y' is pressed by the user, the server 106 implements a concise function that recognizes user satisfaction with the clicks, and then the coordinates are saved. When the user presses 'q,' the cache is cleared. The coordinates are saved only when the user presses the 'y'.

The coordinate details identifying module 212 identify the coordinate details of the ROI and the line crossings along with directions by determining the hierarchy of the stack of coordinates. The identification number assigning module 214 assigns identification numbers to each object in the media content using the CV model 112.

The object detection and tracking module 216 detects and tracks the objects in the media content by determining events of each object in each frame. The events of each object are determined by storing the identification number of each object in a database. The database of each object at the end of each frame is analyzed to generate analytics.

FIG. 3A illustrates an exemplary view of a graphical user interface (GUI) displaying a workspace section in a task pane 304 according to some embodiments herein. The task pane 304 includes a menu bar 302 with options such as "Workspace," "Videos," "Reports," "Change Password," and "Log Out." The task pane 304 allows the user to select either "Video" or "Camera."

If the user selects "Video," the task pane 304 presents sequential options, including "Upload Video," "Select the Use Case," "Mark Boundaries," and "Finish." The selected workspace section guides the user through these steps. For instance, upon choosing the "Video" option, the task pane 304 provides the following media upload options: "Select a Video File," "Paste a Real-Time Streaming Protocol (RTSP) Uniform Resource Locator (URL) here" for live streaming, or "Paste a Video URL Here." By selecting any of these options, the user can upload media content.

FIG. 3B illustrates an exemplary view of a graphical user interface (GUI), which presents the process of selecting a use case according to some embodiments herein. The task pane 304 shows the select use case process, where entities (Segments of choices) 306A-N and their associated predefined areas (use cases) 308A-N are displayed. For example, the entities 306A-N include road industry, transportation, occupational safety, and warehousing. If the user selects "road industry" as the entity, task pane 304 displays the predefined areas that may be "person entry and exit", "intrusion detection," and "queue length monitoring" which correspond to the "road industry" entity. The user can select the entity 306A-N and at least one of predefined areas 308A-N from the predefined areas. For example, the user selects "person entry and exit", "intrusion detection," from the predefined areas 308A-N. As shown in FIG. 3B, a "select use case" option is highlighted in black to indicate that it is being selected by the user, which then displays the list of available segments of choices 306A-N. Each segment of choice 306A-N has an associated list of use cases 308A-N. As shown in FIG. 3B, the user first selects the segment of choice "road industry," which is displayed in a different color to indicate the selection. The system 100 then displays the use cases 308A-N associated with this segment of choice 306A. From these, the user selects a first use case that is "intrusion detection" 308A and a second use case that is the "person entry-exit" 308B, both highlighted in black to indicate selection of multiple use cases 308A-N. The interface further provides options to remove a selected use case or add an unselected use case, for example, "queue length monitoring," which is displayed with an option to add as it is not selected by the user. Thus, the system 100 enables the user to select multiple use cases 308A-N simultaneously that are associated with the selected segment of choice 306A.

Figure 3C:
FIG. 3C illustrates an exemplary view of a graphical user interface (GUI) that displays a process of defining line crossings on a first frame for detecting person entry-exit and intrusion according to some embodiments herein.

FIG. 3C illustrates an exemplary view of a graphical user interface (GUI) that displays a process of defining line crossings on a first frame for detecting person entry-exit and intrusion according to some embodiments herein. Based on the selected entity and the predefined area as illustrated in FIG. 3B, the system 100 provides instructions to the user to mark the line crossings (boundaries) 312A-N corresponding to the second use case on the first frame for detecting the person entry-exit. The "person entry-exit" 308B corresponds to the second use case which enables the user to mark boundaries 312A-N on the first frame. The boundaries are used by the system to detect movements such as entry, exit, or intrusion within the monitored area. The instructions are as follows:

"If you create two points on the image, the system will automatically generate a line.

Draw a first line on the screen to designate the entry/exit boundary. This line will mark the point at which movement begins or ends. Place this line where you want the system to recognize entry or exit actions.

Draw a second line to indicate the direction line. This line will specify the intended direction of movement within the monitored area"

The user is directed to select two points on the first frame to define the first line 312A (the entry/exit boundary) and the second line 312B (the direction of movement). The first line 312A is drawn to detect the person entry-exit and intrusion when an object crosses into or out of the designated line crossings, while the second line 312B defines the expected flow of movement.

Figure 3D:
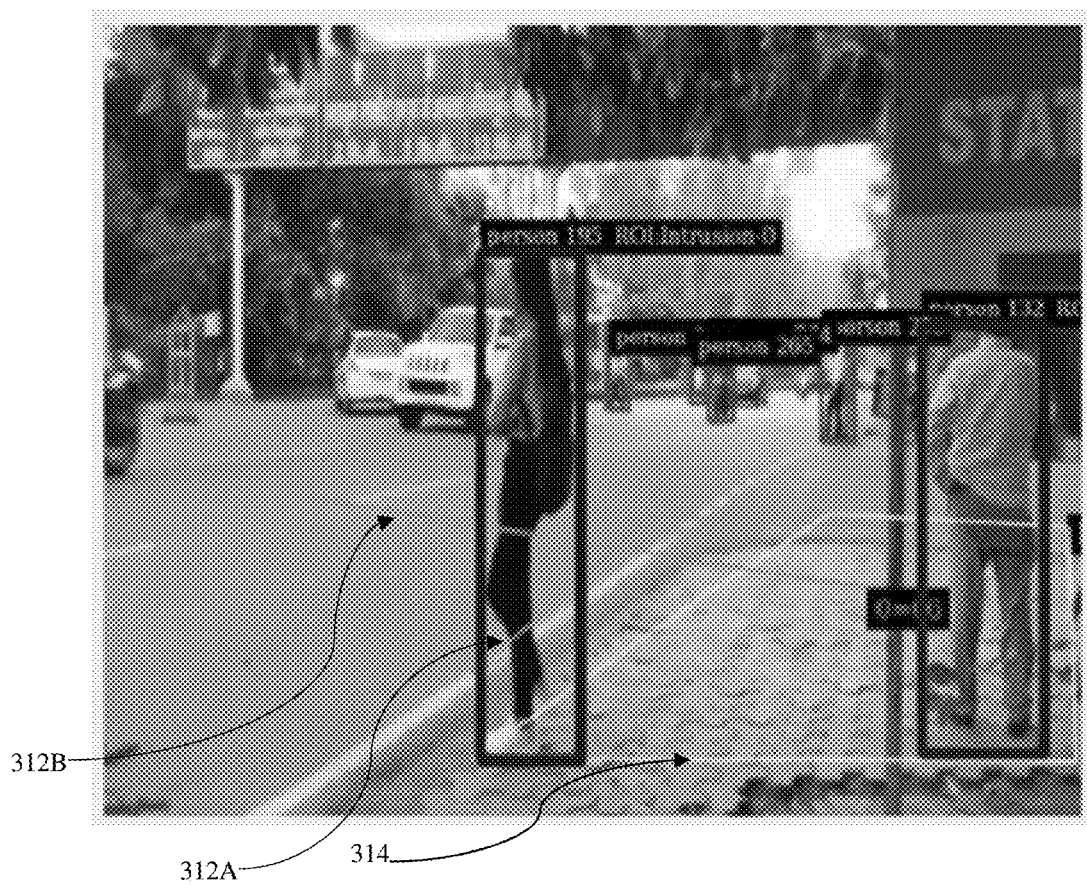
FIG. 3D illustrates an exemplary view of a graphical user interface (GUI) that displays a process of marking a region of Interest (ROI) within a selected predefined area for detecting person entry-exit and intrusion according to some embodiments herein.

FIG. 3D illustrates an exemplary view of a graphical user interface (GUI) that displays a process of marking a region of Interest (ROI) within a selected predefined area for detecting person entry-exit and intrusion according to some embodiments herein. Based on the selected entity and predefined area, such as intrusion detection 308A, as illustrated in FIG. 3B, instructions are provided to mark the region of Interest (ROI) 314 corresponding to the predefined area on the first frame. The intrusion detection 308A corresponds to the first use case which enables the user to define the ROI 314 on the first frame. The instructions are as follows:

"To create a region of interest (ROI), you need to define more than three points. Ensure that the first and last points are joined to complete the ROI.

Click to choose edges of the polygon.

Ensure that the first and last points are joined. Wait for the polygon shape to appear."

The above instructions guide the user to select mouse points to create the ROI 314 on the first frame for detecting the intrusion when an object crosses into or out of the designated region. As shown in FIG. 3D, the media content illustrates a road setup where multiple objects, such as persons, are being tracked in real time. Each tracked object is enclosed within a bounding box and assigned a unique identification number. For example, a person standing near the road is assigned identification number "195", while another person within the region of interest (ROI) 314 is assigned identification number "132". The graphical user interface also displays boundaries 312A-N and the ROI 314 marked on the media content. Both the intrusion detection 308A and the person entry-exit 308B is being executed simultaneously on the media content as seen in the FIG. 3D. Thus, the system 100 defines multiple CV models based on the selected use cases, the region of interest, and boundaries. The system 100 further executes the selected multiple use cases simultaneously on the media content using the multiple defined CV models. Both the first use case and the second use case are being executed simultaneously on the same media content as seen in the FIG. 3D. The objects in the media content is tracked by assigning identification number to each object in the media contents using the CV model 112 and the associated meta data is overlaid on the media contents. As seen in FIG. 3D, even persons located outside the ROI 314 are also tracked, enclosed within a bounding box and assigned identification numbers such as "265". Thus, the metadata are dynamically updated as the objects move within the media contents both within the region of interest 314 as well as outside the region of interest 314.

Figure 3E:
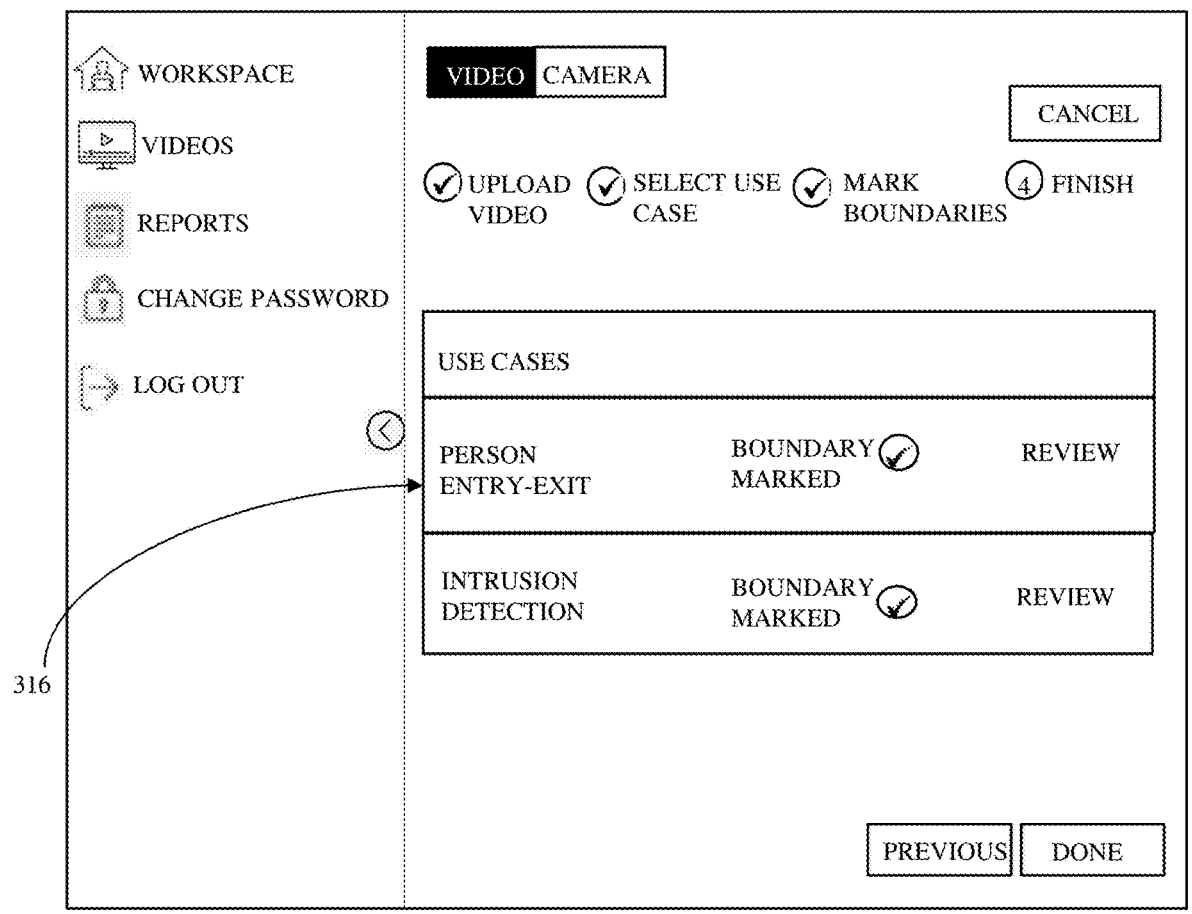
FIG. 3E illustrates an exemplary view of a graphical user interface (GUI) displaying a review dialog box according to some embodiments herein.

FIG. 3E illustrates an exemplary view of a graphical user interface (GUI) displaying a review dialog box 316 according to some embodiments herein. After marking the ROI and line crossings on the first frame as illustrated in FIG. 3C and FIG. 3D, the review dialog box 316 is displayed on the task pane 302. The review dialog box 316 allows the user to review the markings made on the first frame. The task pane 304 allows the user to inspect the ROI and line crossings to verify whether the boundaries are correctly placed. Once the review is complete, the user can choose to save the markings. In this example, the two selected predefined areas are shown in the review dialog box, and the user can select the review option to check the markings on the first frame before saving them.

Figure 3F:
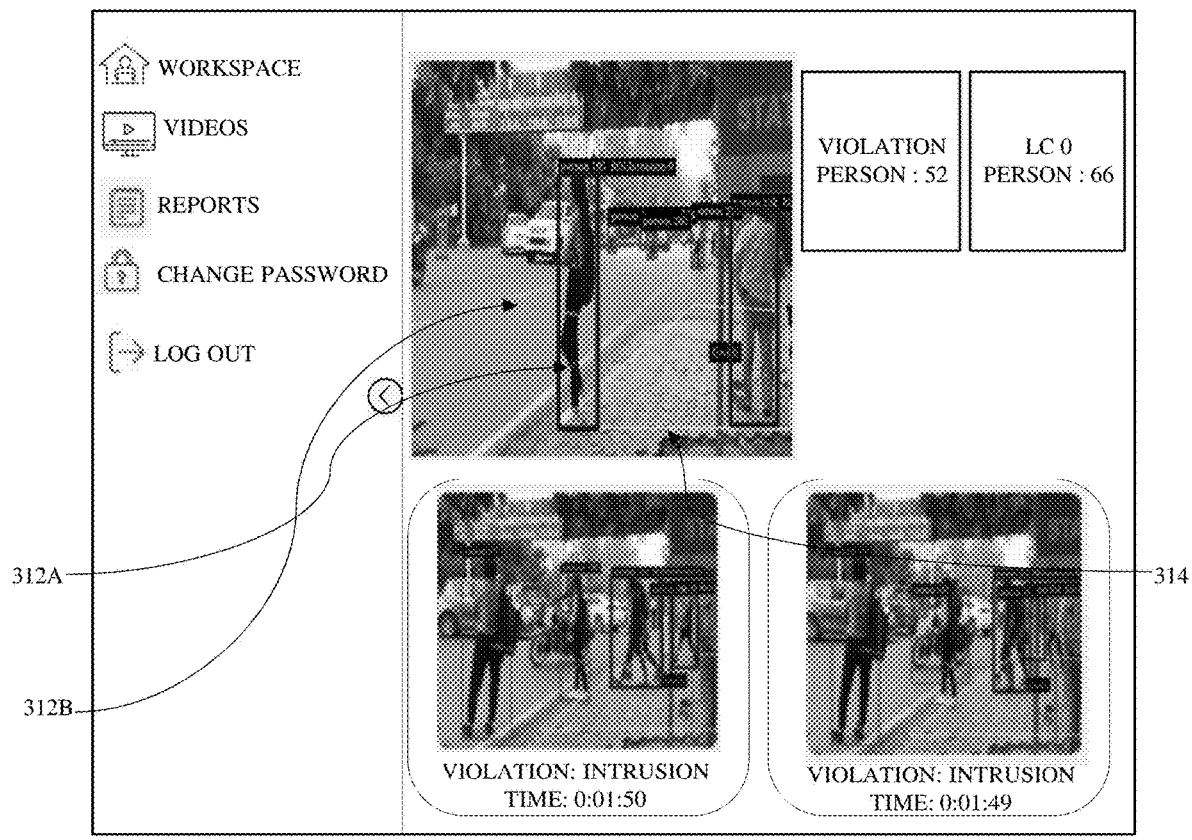
FIG. 3F illustrates an exemplary view of a graphical user interface (GUI) displaying a process of detecting and recording unauthorized intrusions in a predefined area according to some embodiments herein.

FIG. 3F illustrates an exemplary view of a graphical user interface (GUI) displaying a process of detecting and recording unauthorized intrusions in a predefined area according to some embodiments herein. The GUI presents a live surveillance feed of a road where detected intrusions are highlighted using bounding boxes around individuals. This indicates that the system 100 employs Artificial Intelligence (AI)-based object detection to identify unauthorized presence within the monitored zone.

The GUI displays the violation statistics (i.e.,) provides key metrics, including "VIOLATION PERSON: 52", indicating the number of individuals involved in violations in the predefined area of the frame, and "LC 0 PERSON: 66", which may represent the total number of people detected in the area.

The GUI displays feature a violation log, where two smaller surveillance images document recent intrusions. Each entry is labelled "VIOLATION: INTRUSION", with timestamps of 0:01:50 and 0:01:49, indicating a number of people who have entered or violated the predefined area.

The media content is shown playing, with the boundary markings such as line crossings and ROI in the task pane 304. The media content is overlaid with metadata, including detection boxes and the count of persons detected within the media content. The violation count, such as the number of people who have entered or violated the designated boundary, is updated dynamically as the video plays. The interface also tracks and displays the count of individuals who cross the entry or exit lines, indicating movement across predefined boundaries. Below the running video, the frames of the media content are displayed along with a timeline. As seen in FIG. 3F, the GUI displays the media content which has the markings of both the region of interest 314 and the boundaries 312A-N marked by the user. The region of interest 314 marked corresponds to the first use case that is the "Intrusion detection" 308A and the boundaries 312A-N corresponds to the second use case that is the "Person entry-exit" 308B. Each object in the media content is being tracked based on the coordinate details of the ROI 314 and the boundaries 312A-N and by assigning identification number to each object in the media content to generate the metadata associated with each frame which is seen in FIG. 3F. The FIG. 3F shows the frames with updated metadata along with the timestamps. The metadata includes the key metrics that is the "violation person" count and the "LC person" count which is being updated as the objects move within the media content. The "violation person" corresponds to the first use case and the "LC person" count corresponds to the second use case. Both the meta data and the key metrics associated with the first use and the second use is being dynamically updated and overlaid in the media content as seen in the FIG. 3F. Thus, the system 100 enables the execution of the first use case and the second use case simultaneously on the same media content and the corresponding meta data for each frame is being updated and the key metrics associated with selected multiple use cases is being updated dynamically as the objects move within the media content both within and outside the ROI.

Figure 4A:
FIGS. 4A, 4B, and 4C are exemplary views of tracking objects using a server 106 of FIG. 1 in a pre-defined area using a Computer Vision (CV) model according to some embodiments herein.
Figure 4B:
Figure 4C:
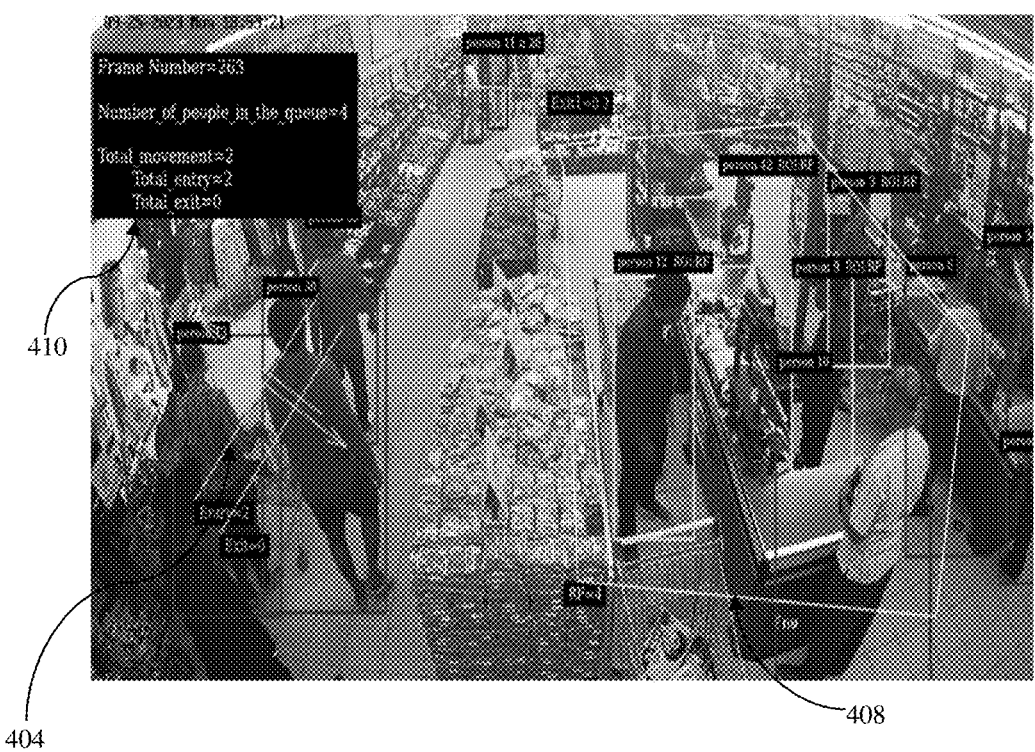

FIGS. 4A, 4B, and 4C are exemplary views of tracking objects using a server 106 of FIG. 1 in a pre-defined area using a Computer Vision (CV) model according to some embodiments herein. The exemplary view in FIG. 4A depicts coordinate details 402 of the line crossings along with directions 404. The coordinate details 402 includes the coordinates of the mouse points selected by the user on the frame of a retail industry. The coordinate details 402 of the line crossings along with directions includes the coordinates of start and end point of entry or exit line, the coordinates for entry direction and the coordinates for the exit direction. The exemplary view depicts the coordinates of start point, for example, (468, 482), the coordinates of end point, for example, (217, 792).

The exemplary view in FIG. 4B depicts coordinate details 406 of the ROI 408. The coordinate details 402 includes the coordinates of the mouse points selected by the user on the at least one of the one or more frames. The coordinate details 406 of the ROI 408 includes the coordinates of first point, second point, third point, fourth point, fifth point and sixth point. For example, the coordinates of first point of the region of interest are (965, 296), the coordinates of second point of the region of interest are (994, 914), etc.

The FIG. 4C depicts analytics 410 that are generated by the computer vision model 112 and markings of line crossings along with directions (boundaries) 404 and ROI 408 as illustrated in FIG. 4A and FIG. 4B. The objects in the media content are tracked by assigning identification number using the CV model 112 and the analytics 410 is generated. As seen in FIG. 4C, the markings of ROI 408 and the boundaries 404 are shown with the objects in the media content. The CV models are defined based on the selected use cases, the ROI 408 and the boundaries 404. The selected multiple use cases are executed simultaneously on the media content by enabling the defined CV models to track and generate metadata as seen in the FIG. 4C. Even objects outside the ROI 408 is being assigned identification number such as "Person 11" as seen in the FIG. 4C. The metadata and the key metrics associated with the selected multiple use cases is being updated in real-time. The analytics 410 includes frame number as 263, number of people in the queue as 4, total movement as 2, total entry as 2, and total exit as 0 which corresponds to the key metrics associated with the selected multiple use cases. Thus, the system 100 executes multiple use cases simultaneously on the same media content and tracks each object by assigning identification number to each object both within and outside the region of interest to generate meta data and key metrics associated with the selected multiple use cases.

Figure 5A:
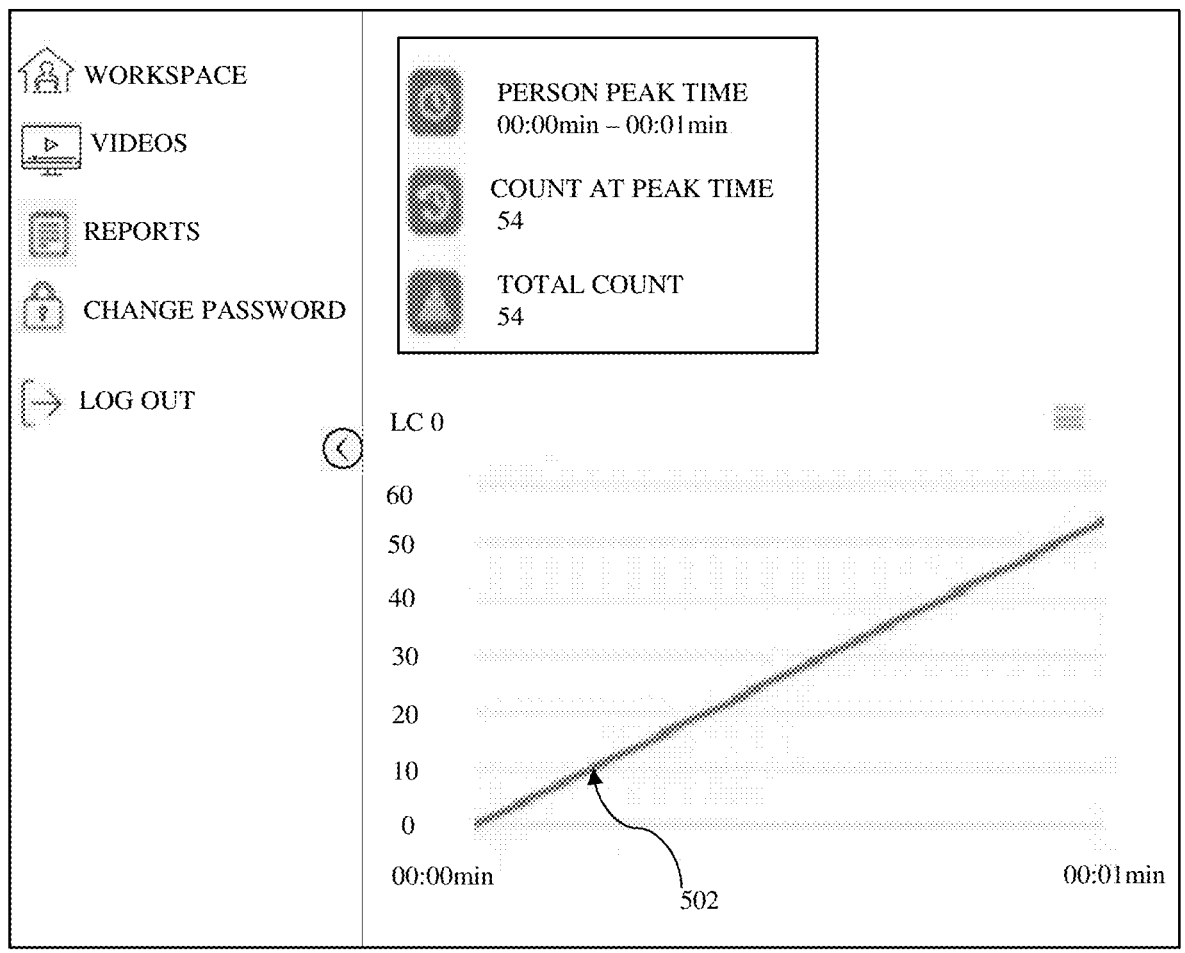
FIG. 5A illustrates an exemplary view of a graphical user interface (GUI) displaying analytics generated for person entry-exit according to some embodiments herein.

FIG. 5A illustrates an exemplary view of a graphical user interface (GUI) displaying analytics generated for person entry-exit according to some embodiments herein. The GUI depicts the count of people at Y-axis and time at X-axis, highlighting trends in entry and exit activity. The GUI depicts a graph 502 that represents peak time, when the highest number of people entered or exited at that time, and the total people counts are displayed (i.e., 54).

Figure 5B:
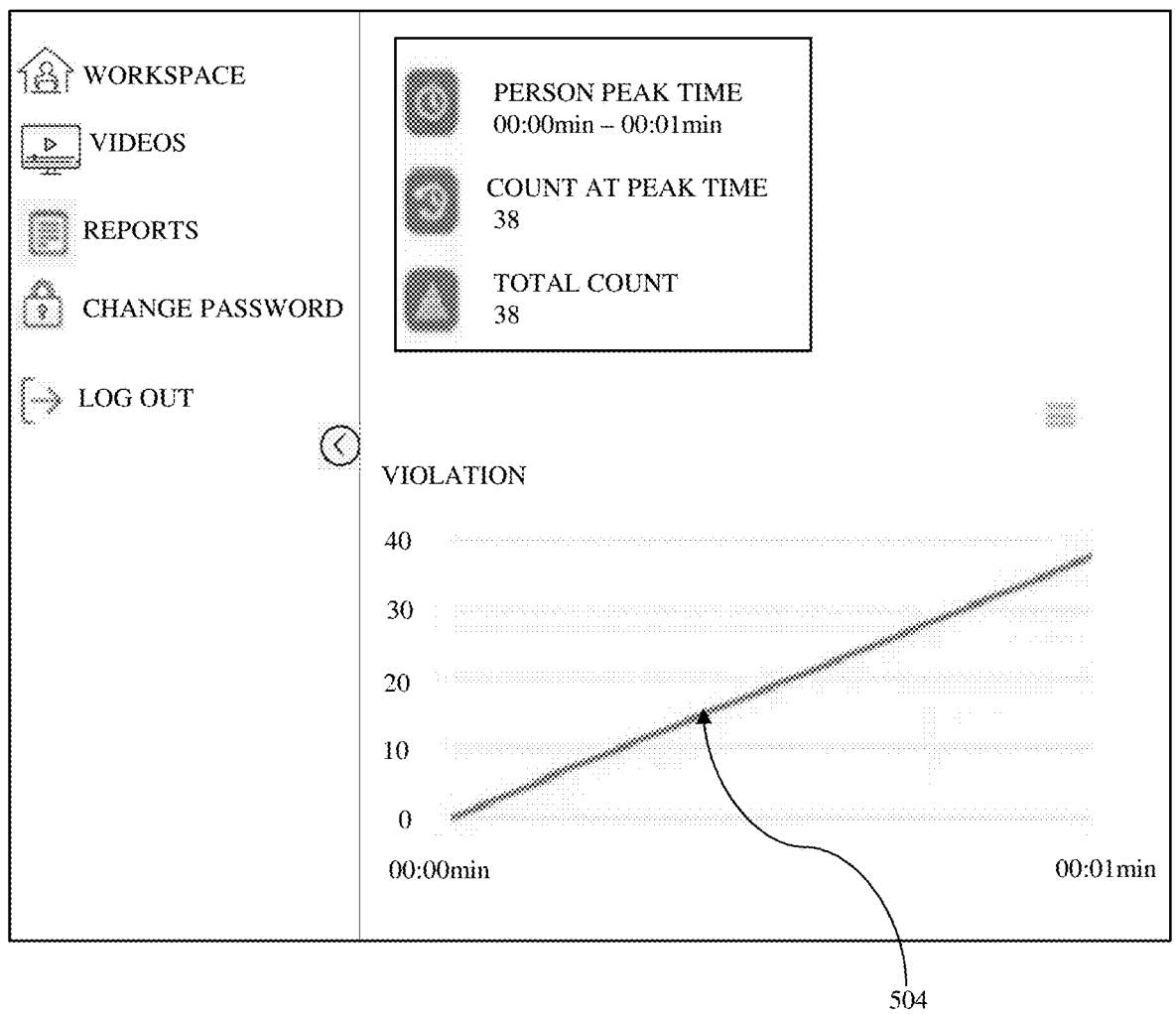
FIG. 5B illustrates an exemplary view of a graphical user interface (GUI) displaying analytics generated for intrusion according to some embodiments herein.

FIG. 5B illustrates an exemplary view of a graphical user interface (GUI) displaying analytics generated for intrusion according to some embodiments herein. The GUI depicts count of people at Y-axis and time at X-axis who have violated or entered the region of interest. The GUI depicts a graph 504 which represents peak time, when the highest number of intrusions occurred, and the peak count, indicating the number of people at that time, and total count are displayed (i.e., 38).

Figure 6:
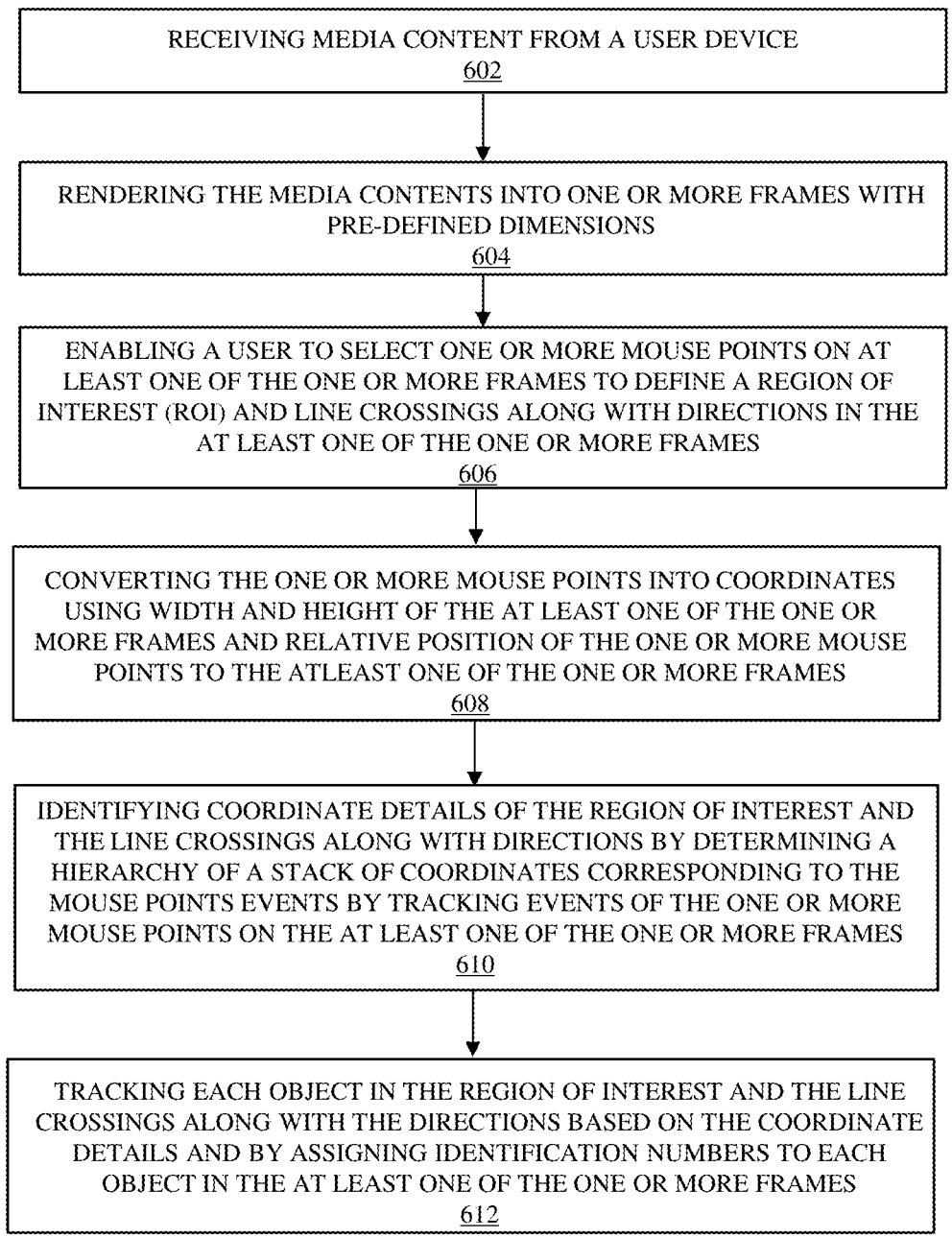
FIG. 6 is a flow diagram that illustrates a method for detecting and tracking objects using a Computer Vision (CV) model according to some embodiments herein.

FIG. 6 is a flow diagram that illustrates a method for detecting and tracking objects using a Computer Vision (CV) model according to some embodiments herein. At a step 602, the method includes receiving media content from a user device 102. At a step 604, the method includes rendering the media content into one or more frames with pre-defined dimensions. At a step 606, the method includes enabling a user to select one or more mouse points on at least one of the one or more frames to define a Region of Interest (ROI) and line crossings along with directions in the at least one of the one or more frames. At a step 608, the method includes converting the one or more mouse points into coordinates using width and height of the at least one of the one or more frames and relative position of the one or more mouse points to the at least one of the one or more frames. At a step 610, the method includes identifying coordinate details of the region of interest and the line crossings along with the directions by determining a hierarchy of a stack of coordinates corresponding to the mouse points events by tracking events of the one or more mouse points on the at least one of the one or more frames. At a step 612, the method includes tracking each object in the region of interest and the line crossings along with the directions based on the coordinate details and by assigning identification numbers to each object in the at least one of the one or more frames.

Figure 7:
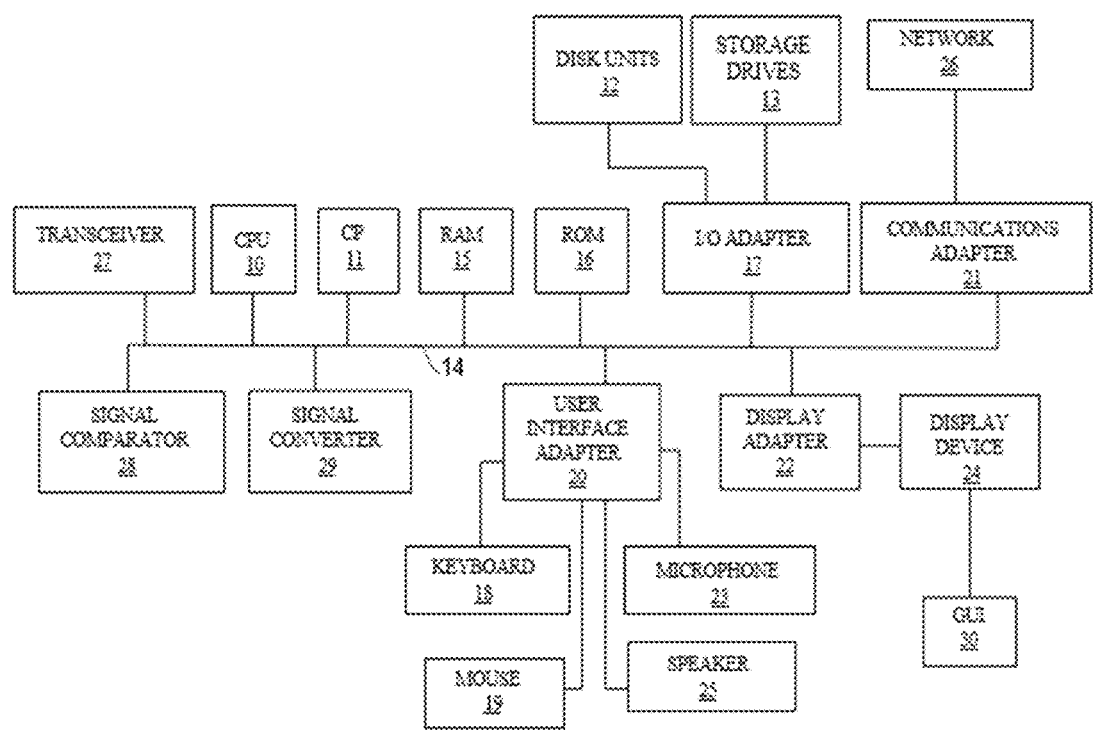
FIG. 7 is a schematic diagram of a computer architecture in accordance with the embodiments herein.

A representative hardware environment for practicing the embodiments herein is depicted in FIG. 7, with reference to FIGS. 1 through 6. This schematic drawing illustrates a hardware configuration of a server 106/computer system/computing device in accordance with the embodiments herein. The system includes at least one processing device CPU 10 that may be interconnected via system bus 14 to various devices such as a random-access memory (RAM) 15, read-only memory (ROM) 16, and an input/output (I/O) adapter 17. The I/O adapter 17 can connect to peripheral devices, such as disk units 12 and program storage drives 13 that are readable by the system. The system can read the inventive instructions on the program storage devices 13 and follow these instructions to execute the methodology of the embodiments herein. The system further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a display adapter 22, and the display adapter 22 connects the bus 14 to a display device 24, which provides a graphical user interface (GUI) 30 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope.

What is claimed is:

1. A processor-implemented method for displaying a media content with dynamically updated metadata through a Graphical User Interface (GUI) using one or more Computer Vision (CV) models, wherein the method comprises:
   rendering the media content into one or more frames displayed on a display screen associated with a user device;
   processing, through the user device, a selection of multiple use cases that are associated with a segment of choice that is selected, wherein the selection of the multiple use cases comprises
      enabling, using an input device associated with the user device, a user to select a plurality of points on at least one of the one or more frames to define a Region of Interest (ROI) corresponding to a first use case; and
enabling, using the input device associated with the user device, the user to select a plurality of points on the at least one of the one or more frames to mark boundaries corresponding to a second use case;
defining multiple CV models based on the selected use cases, the region of interest, and the boundaries;
executing the selected multiple use cases simultaneously on the media content by enabling the multiple defined CV models to
identify coordinate details of the ROI and the boundaries by converting the plurality of points selected using the input device into coordinates using width and height of the at least one of the one or more frames and relative position of the plurality of points to the at least one of the one or more frames; and
track each object in the media content based on the coordinate details and by assigning identification numbers to each object in the at least one of the one or more frames to generate the metadata associated with each frame, wherein the metadata comprises key metrics associated with the selected multiple use cases; and
overlaying the metadata and the key metrics onto the media content and displaying through the GUI, wherein the metadata and the key metrics associated with the selected multiple use cases are overlaid onto the media content and are dynamically updated as the plurality of objects move within the media content both within the region of interest as well outside the region of interest.

2. The processor-implemented method of claim 1, wherein the method comprises (i) defining the ROI by selecting at least three points in the at least one of the one or more frames and (ii) marking the boundaries by selecting two points in the at least one of the one or more frames by the user.

3. The processor-implemented method of claim 1, wherein the method comprises pre-processing the at least one of the one or more frames from the media content using at least one of pre-processing techniques.

4. The processor-implemented method of claim 1, wherein at least one use case for an entity is selected by,
enabling, using the user device, the user to select the entity from a plurality of entities, and
enabling, using the user device, the user to select the at least one use case from the one or more use cases that is generated based on the entity.

5. The processor-implemented method of claim 1, wherein the media content of the entity are captured using an image capturing device.

6. The processor-implemented method of claim 1, wherein the method comprises determining a database for each object by storing the identification number of each object in the at least one of the one or more frames using the one or more CV models, wherein the database of each object is analysed at end of the at least one of the one or more frames.

7. The processor-implemented method of claim 1, wherein the method comprises generating analytics of the media content by overlaying the media content on a dashboard associated with the user device using the one or more CV models.

8. The processor-implemented method of claim 1, wherein the coordinate details of the region of interest and the boundaries are identified by determining a hierarchy of a stack of coordinates corresponding to the plurality of points by tracking events of the plurality of points selected using the input device on the at least one of the one or more frames.

9. The processor-implemented method of claim 1, wherein the metadata comprises detection class, detection object identification, detection confidence, detection coordinates, image of detected object, frame number when detected, time of detection, where was the object first detected, and change of the object placement over time in the coordinates and movement of the objects along with timestamps.

10. The processor-implemented method of claim 9, wherein the plurality of points selected using the input device on the at least one of the one or more frames are connected to form markings of the Region of Interest (ROI) and the boundaries.

11. The processor-implemented method of claim 1, wherein the user is enabled to select the plurality of points on the at least one of the one or more frames by following a set of instructions provided for the selected multiple use cases, wherein the set of instructions is specific to each pre-defined area.

12. The processor-implemented method of claim 11, wherein the method comprises a review screen that is displayed on the user device to enable the user to review the markings formed by connecting the plurality of points selected using the input device on the at least one of the one or more frames of the media content.

13. A system for displaying a media content with dynamically updated metadata through a Graphical User Interface (GUI) using one or more Computer Vision (CV) models, wherein the system comprises:
a server that comprises:
a memory that comprises set of instructions:
a processor executes the set of instructions and is configured to:
render the media content into one or more frames displayed on a display screen associated with a user device;
process, through the user device, a selection of multiple use cases that are associated with a segment of choice that is selected, wherein the selection of the multiple use cases comprises
enabling, using an input device associated with the user device, a user to select a plurality of points on at least one of the one or more frames to define a Region of Interest (ROI) corresponding to a first use case; and
enabling, using the input device associated with the user device, the user to select a plurality of points on the at least one of the one or more frames to mark boundaries corresponding to a second use case;
define multiple CV models based on the selected use cases, the region of interest, and the boundaries;
executing the selected multiple use cases simultaneously on the media content by enabling the multiple defined CV models to
identify coordinate details of the ROI and the boundaries by converting the plurality of points selected using the input device into coordinates using width and height of the at least one of the one or more frames and relative position of the plurality of points to the at least one of the one or more frames; and
track each object in the media content based on the coordinate details and by assigning identification numbers to each object in the at least one of the one or more frames to generate the metadata associated with each frame, wherein the metadata comprises key metrics associated with the selected multiple use cases; and overlay the metadata and the key metrics onto the media content and displaying through the GUI, wherein the metadata and the key metrics associated with the selected multiple use cases are overlaid onto the media content and are dynamically updated as the plurality of objects move within the media content both within the region of interest as well outside the region of interest.

14. The system of claim 13, wherein the processor is configured to (i) define the ROI by selecting at least three points in the at least one of the one or more frames and (ii) mark the boundaries by selecting two points in the at least one of the one or more frames by the user.

15. The system of claim 13, wherein the processor is configured to pre-process the at least one of the one or more frames from the media content using at least one of pre-processing techniques.

16. The system of claim 13, wherein at least one use case for an entity is selected by,
enabling, using the user device, the user to select the entity from a plurality of entities, and
enabling, using the user device, the user to select the at least one use case from the one or more use cases that is generated based on the entity.

17. The system of claim 13, wherein the media content of the entity are captured using an image capturing device.

18. The system of claim 13, wherein the processor is configured to determine a database for each object by storing the identification number of each object in the at least one of the one or more frames using the one or more CV models, wherein the database of each object is analyzed at end of the at least one of the one or more frames.

19. The system of claim 13, wherein the processor is configured to generate analytics of the media content by overlaying the media content on a dashboard associated with the user device using the one or more CV models.

20. One or more non-transitory computer-readable storage mediums storing one or more sequences of instructions, which when executed by one or more processors, cause a method for displaying a media content with dynamically updated metadata through a Graphical User Interface (GUI) using one or more Computer Vision (CV) models, wherein the method comprises:

rendering the media content into one or more frames displayed on a display screen associated with a user device;

processing, through the user device, a selection of multiple use cases that are associated with a segment of choice that is selected, wherein the selection of the multiple use cases comprises
enabling, using an input device associated with the user device, a user to select a plurality of points on at least one of the one or more frames to define a Region of Interest (ROI) corresponding to a first use case; and
enabling, using the input device associated with the user device, the user to select a plurality of points on the at least one of the one or more frames to mark boundaries corresponding to a second use case;

defining multiple CV models based on the selected use cases, the region of interest, and the boundaries;

executing the selected multiple use cases simultaneously on the media content by enabling the multiple defined CV models to
identify coordinate details of the ROI and the boundaries by converting the plurality of points selected using the input device into coordinates using width and height of the at least one of the one or more frames and relative position of the plurality of points to the at least one of the one or more frames; and
track each object in the media content based on the coordinate details and by assigning identification numbers to each object in the at least one of the one or more frames to generate the metadata associated with each frame, wherein the metadata comprises key metrics associated with the selected multiple use cases; and overlaying the metadata and the key metrics onto the media content and displaying through the GUI, wherein the metadata and the key metrics associated with the selected multiple use cases are overlaid onto the media content and are dynamically updated as the plurality of objects move within the media content both within the region of interest as well outside the region of interest.

* * * * *